（12） United States Patent
Füldner

(10) Patent No.: US 12,459,807 B2
(45) Date of Patent: Nov. 4, 2025

(54) MEMS DEVICE HAVING A MECHANICAL BARRIER STRUCTURE

(71) Applicant: Infineon Technologies AG, Neubiberg (DE)

(72) Inventor: Marc Füldner, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 440 days.

(21) Appl. No.: 18/060,329

(22) Filed: Nov. 30, 2022

(65) Prior Publication Data

US 2023/0202833 A1    Jun. 29, 2023

(30) Foreign Application Priority Data

Dec. 29, 2021 (EP) ..................................... 21218232

(51) Int. Cl.
*B81B 3/00* (2006.01)

(52) U.S. Cl.
CPC .... *B81B 3/0021* (2013.01); *B81B 2201/0257* (2013.01); *B81B 2203/0353* (2013.01); *B81B 2207/11* (2013.01)

(58) Field of Classification Search
CPC ................ B81B 7/0061; B81B 3/0021; B81B 2201/0257; B81B 2203/0353; B81B 2207/11; H04R 1/086; H04R 19/005; H04R 19/04; H04R 2201/003
See application file for complete search history.

(56) References Cited

U.S. PATENT DOCUMENTS

| | | | |
|---|---|---|---|
| 2014/0131819 A1* | 5/2014 | Gritti | .................. B81C 1/00261 438/51 |
| 2017/0280218 A1 | 9/2017 | Wang et al. | |
| 2018/0070158 A1 | 3/2018 | Watson et al. | |
| 2019/0270639 A1* | 9/2019 | Lorenz | .................. B81B 3/0018 |
| 2020/0092658 A1* | 3/2020 | Zou | ....................... H04R 19/005 |

* cited by examiner

*Primary Examiner* — Moazzam Hossain
(74) *Attorney, Agent, or Firm* — Slater Matsil, LLP

(57) ABSTRACT

A MEMS device comprises a housing with an interior volume, wherein the housing includes an access port to the interior volume; a MEMS sound transducer in the housing, and a mechanical barrier structure having a plate element that is fixed by elastic spacers to a carrier and overlaps the access port, and providing a ventilation path passing a boundary region of the plate element, wherein a clearance of the ventilation path is set by the distance of the boundary region of the plate element to the housing or by the distance of the boundary region of the plate element to a blocking structure that opposes the boundary region of the plate element.

18 Claims, 9 Drawing Sheets

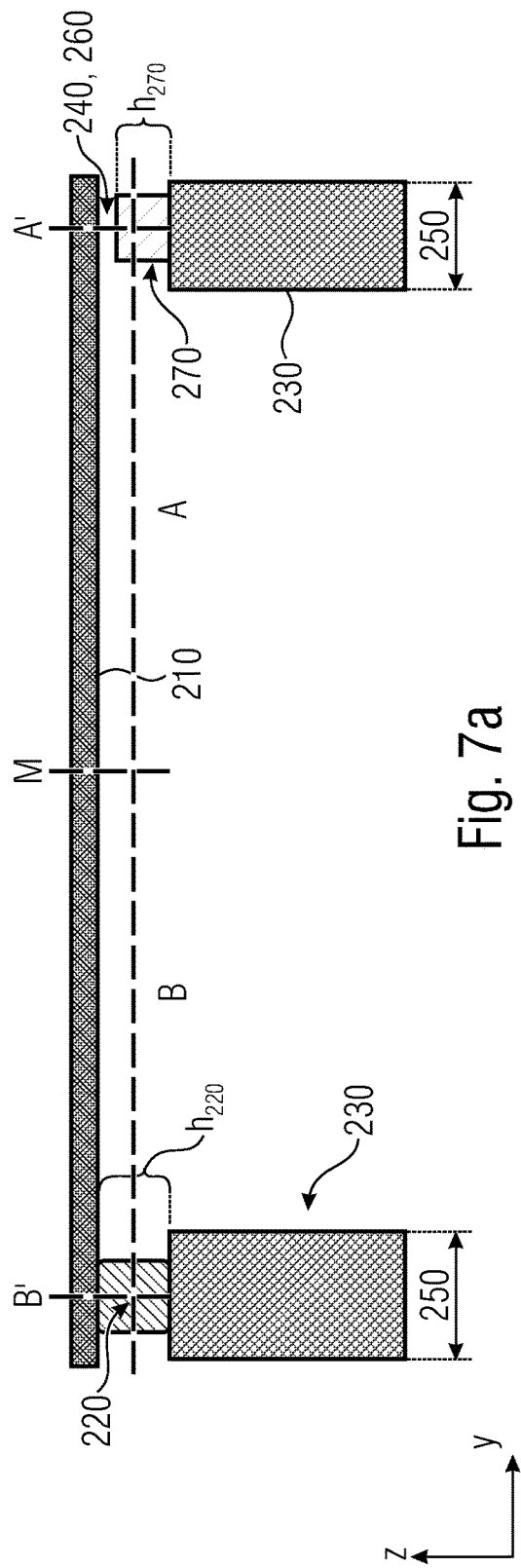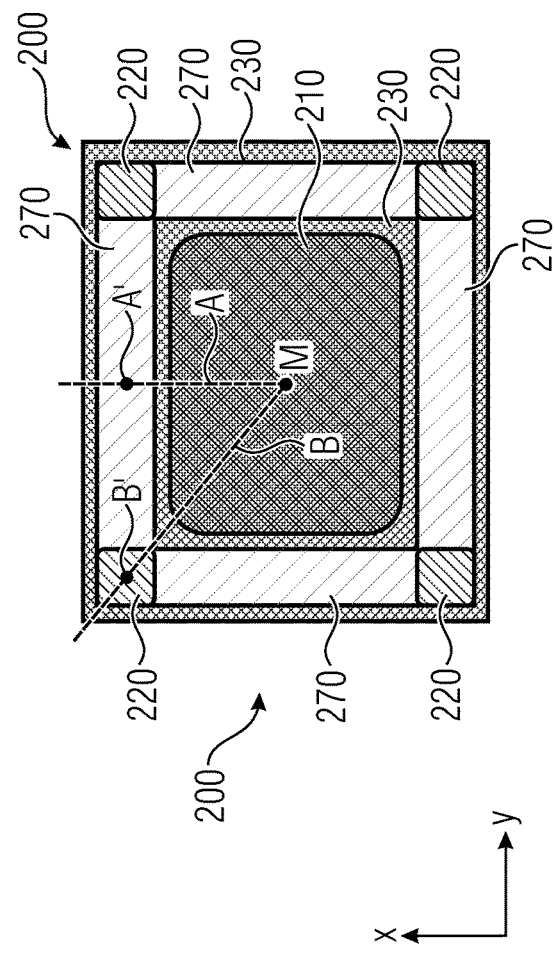

MEMS DEVICE HAVING A MECHANICAL BARRIER STRUCTURE

CROSS-REFERENCE TO RELATED APPLICATIONS

This application claims the benefit of European Patent Application No. 21218232, filed on Dec. 29, 2021, which application is hereby incorporated herein by reference.

TECHNICAL FIELD

Embodiments of the present disclosure relate to a MEMS device (MEMS=microelectromechanical system) having an environmental barrier structure. More specifically, embodiments relate to a concept of protecting a MEMS device with an inexpensive environmental barrier structure from the external environment.

BACKGROUND

Acoustic sensors like MEMS microphones are open devices and exposed to the external environment due to the functioning thereof as sensors in order to be able, for example, to capture sound level changes, pressure changes, etc. in the ambient atmosphere. Therefore, such sensors are prone to contaminations, for example organic or inorganic particles, liquids, humidity etc., entering the active sensor structures. This can lead to sensor malfunction or reduced performance. End customers, like mobile phone manufactures, spend high efforts to protect the sensors and transducer within the application by costly meshes, membranes and special ports against environment.

Also, during component assembly when the MEMS sensor is not protected at all, contaminations within the production lines can cause malfunctions. As a consequence, cost intensive clean room assembly is required or assembly yield losses may occur.

Therefore, there is a need in the field of MEMS devices to implement a MEMS device having an environmental barrier with improved characteristics, e.g., which can provide an effective protection against environmental influences and which can be inexpensively implemented.

Such a need can be solved by the MEMS device according to the independent claims. Further, specific implementations of the MEMS device are defined in the dependent claims.

SUMMARY

According to an embodiment, a MEMS device comprises a housing with an interior volume, wherein the housing comprises an access port to the interior volume. The MEMS device comprises a MEMS sound transducer in the housing, and a mechanical barrier structure having a plate element which is fixed by means of elastic spacers to a carrier and overlaps the access port. The mechanical barrier structure provides a ventilation path passing a boundary region of the plate element, wherein a clearance of the ventilation path is set by the distance of the boundary region of the plate element to the housing, in particular to the carrier or to the substrate, and/or by the distance of the boundary region of the plate element to a blocking structure which opposes the boundary region of the plate element. The housing may comprise a lid element and a substrate onto which the MEMS is mounted. The access port may be arranged in the substrate or in the lid element. This means, the access port can be top port in the lid element or bottom port in the substrate. Therewith, also the mechanical barrier can be attached to or integrated in the lid or the substrate.

Embodiments describe a construction of an inexpensive (low cost) environmental barrier featuring a high acoustical compliance and low bypass ventilation. High compliance can be realized by elastic spacers, for example by low E-modulus spring elements. A low bypass ventilation is realized for example by a closed plate element and a blocking structure, which may also be called a sealing wall.

BRIEF DESCRIPTION OF THE DRAWINGS

In the following, embodiments of the present disclosure are described in more detail with respect to the figures, in which:

FIGS. 6a and 6b show schematic views of a mechanical barrier structure of a MEMS device according to an embodiment, wherein FIG. 6a shows a cross sectional side view, and FIG. 6b shows a top view;

FIGS. 7a and 7b show schematic views of a mechanical barrier structure of a MEMS device according to an embodiment, wherein FIG. 7a shows a cross sectional side view, and FIG. 7b shows a top view;

FIGS. 8a and 8b show schematic views of a mechanical barrier structure of a MEMS device according to an embodiment, wherein FIG. 8a shows a cross sectional side view, and FIG. 8b shows a top view.

Figure 1:
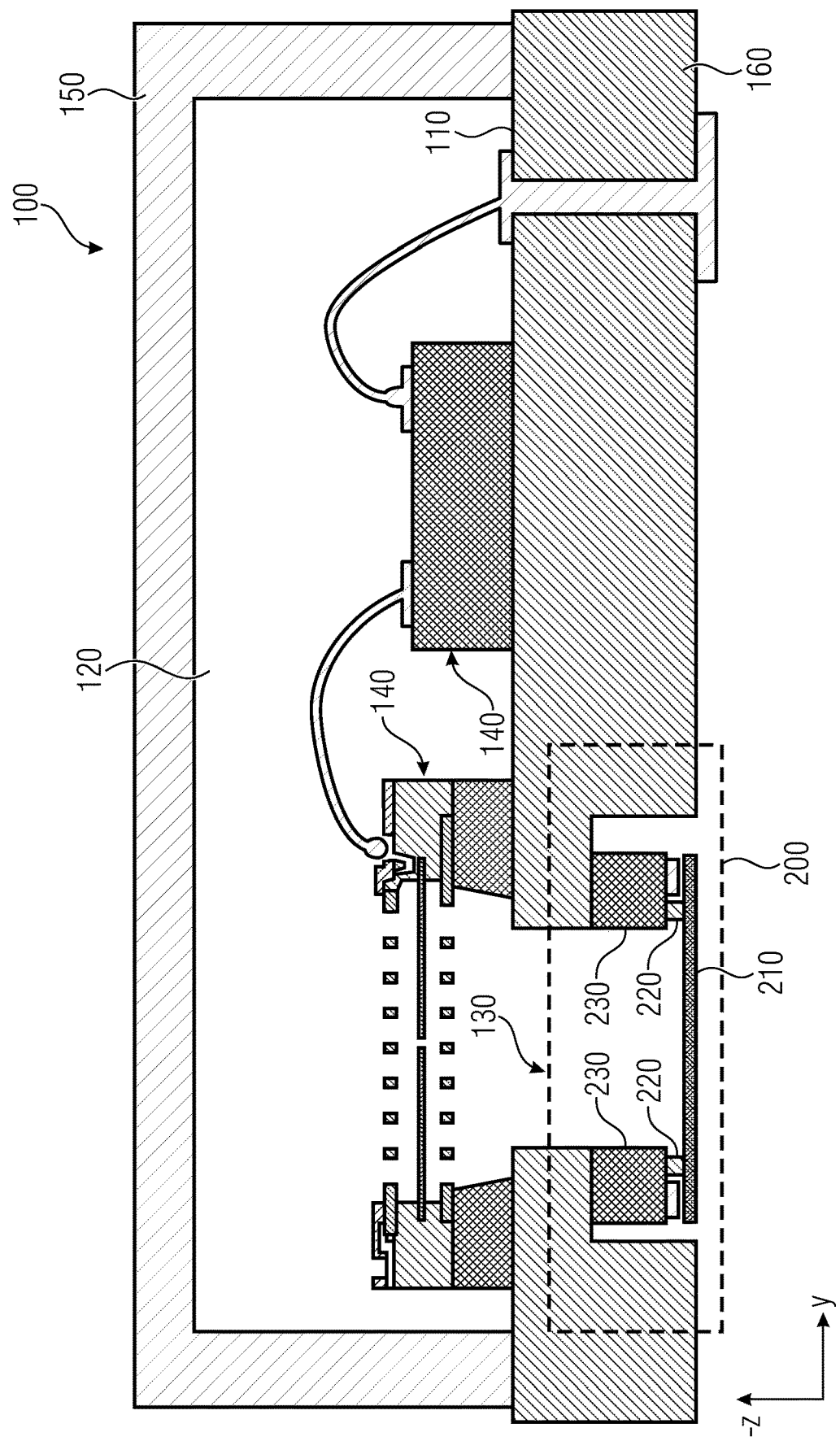
FIG. 1 shows a schematic cross sectional side view of a MEMS device having a mechanical barrier structure according to an embodiment.

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-y-plane corresponds, i.e. is parallel, to a reference plane (=x-y-plane, e.g. a main surface region of a substrate), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to (or in) the x-y-plane, wherein the term "vertical" means a direction parallel to the z-direction.

FIG. 1 to FIG. 5 show schematic cross-sectional views of a part of a MEMS device 100 providing a mechanical barrier structure 200 according to embodiments. The mechanical barrier structure 200 functions as a protection structure, protecting the MEMS device 100 from the external environment. FIG. 6 to FIG. 9 show embodiments of the barrier structure 200, which can be attached to one of the embodiments of the MEMS device 100 shown in FIGS. 1 to 5. For example, the mechanical barrier structure 200 shown in FIG. 6 is attached to the MEMS device 100 shown in FIGS. 1, 3 to 5. Of course, a mechanical barrier structure 200 according to FIG. 7 to FIG. 9 may also be mounted into the MEMS device 100 of one of the embodiments of FIG. 1 to FIG. 5.

Figure 6A:
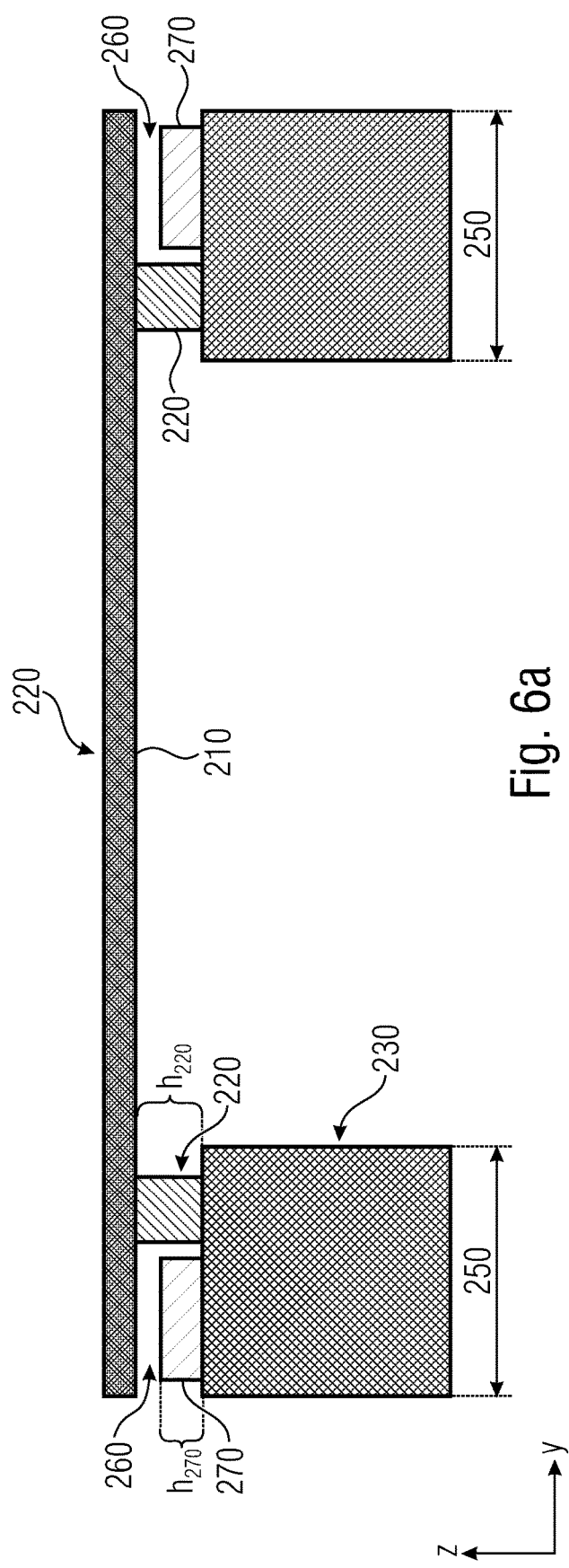
Figure 6B:
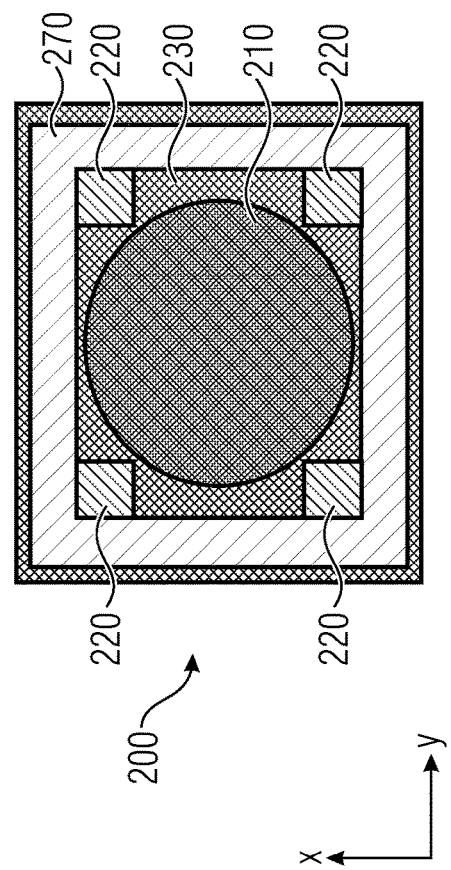
Figure 8A:
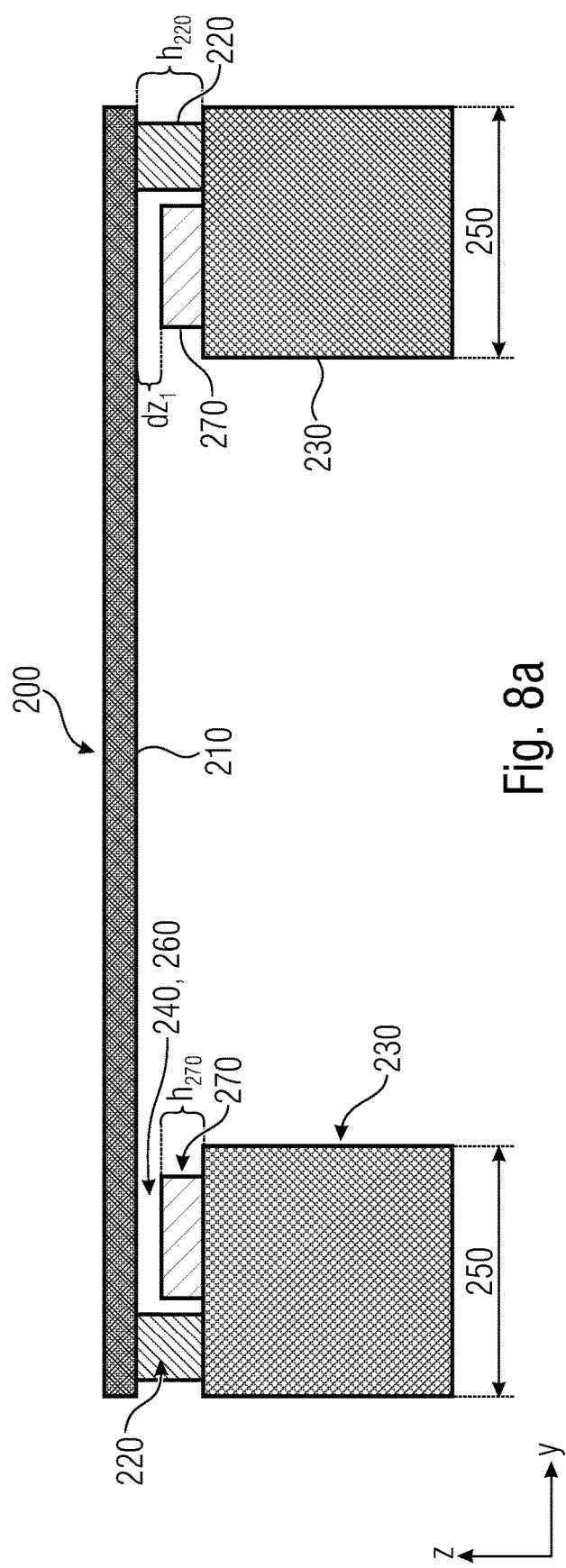
Figure 8B:
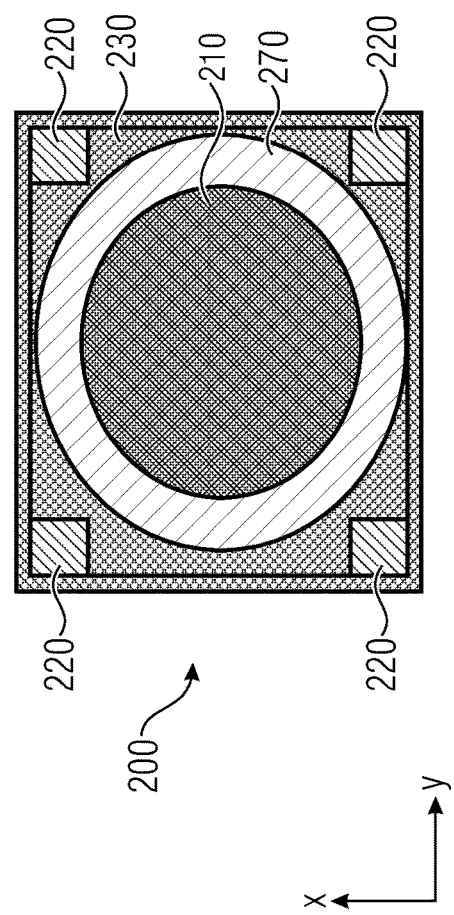

The FIGS. 1 to 5 show side views of the MEMS device having the mechanical barrier structure 200 as shown in FIG. 6; FIGS. 6a, 7a, 8a show side views of different embodiments of the mechanical barrier structure 200, while the FIGS. 6b, 7b and 8b show top views of the mechanical barrier structure 200. The side views extend in (or parallel to) the z-y plane, while the top (plan) view extend in (or parallel to) the x-y plane.

The concept of protecting the MEMS device 100 by means of the mechanical barrier structure 200 from the external environment as disclosed herein becomes apparent in synopsis of the FIGS. 1a to 9.

According to embodiments shown in one of the FIGS. 1 to 5, the MEMS device 100 comprises a housing 110 with an interior volume 120, wherein the housing 110 comprises an access port or sound port 130 to the interior volume 120. Further, the MEMS device 100 comprises a MEMS sound transducer 140 in the housing 110. The MEMS device 110 comprises a mechanical barrier structure 200. The mechanical barrier structure 200 comprises a plate element 210 which is fixed by means of elastic spacers 220 to a carrier 230 and overlaps the access port 130. The term "overlaps" may be used in the sense of "covering completely", in that the plate element 210 completely covers the access port 130 or in that a (vertical) projection of the plate element 210 completely covers the cross-section area of the access port 130.

The housing 110 comprises a lid element 150 and a substrate 160. The MEMS sound transducer 140 is mounted on the substrate 160. As can be seen in FIGS. 1 to 5, the access port 130 can be a top port in the lid element 150 (see FIG. 3) or a bottom port in the substrate 160 (see FIGS. 1, 2 and 4, 5). The mechanical barrier structure 200 can be attached to or integrated in the lid element 150 (see FIG. 3) or the substrate 160 (see FIGS. 1, 2 and 4, 5). This means, the housing 110 comprises the mechanical barrier structure 200. The mechanical barrier structure 200 can be part of or can be coupled to the access port 130 to the interior volume 120, as can be seen in FIGS. 1 to 5. The lid element 150 is attached to the substrate 160. The lid element 150 is designed such that the lid element 150 provides together with the substrate the interior volume 120. For example, the lid element 150 may be a cap, e.g. an electrically conductive or metallic cap, e.g. having a cross-sectional U-shape or the like, to provide in connection with the substrate 160 the interior volume 120 of the housing 110. The MEMS sound transducer 140 is accommodated in the interior volume 120. The substrate 160 covers the interior volume 120. The access port 130 to the MEMS sound transducer 140 may be covered by the mechanical barrier structure 200 (see FIGS. 1 to 5).

Figure 2:
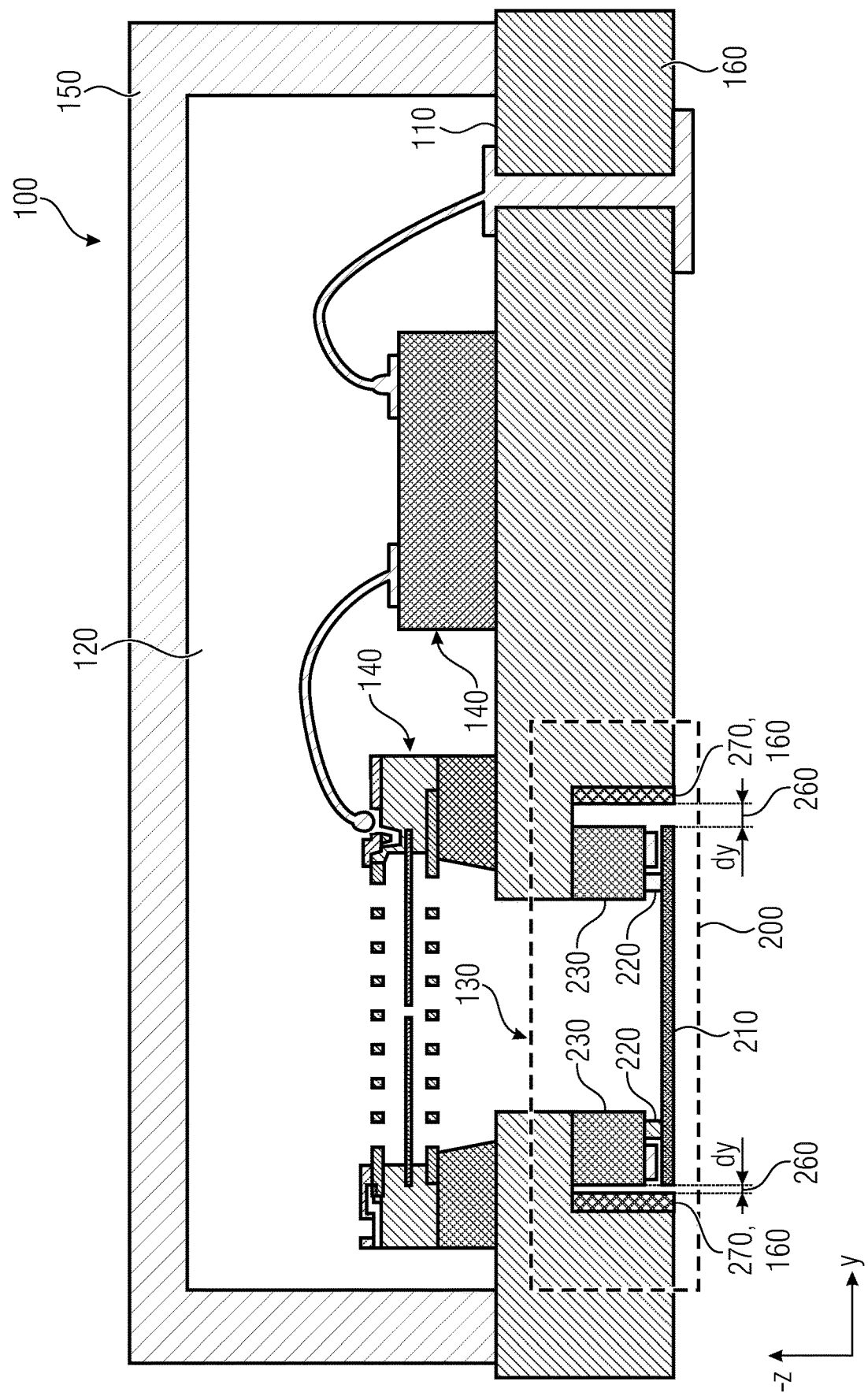
FIG. 2 shows a schematic cross sectional side view of a MEMS device having a mechanical barrier structure according to an embodiment.

The mechanical barrier structure 200 provides a ventilation path 240 passing a boundary region 250 of the plate element 210 (see FIGS. 6 to 9). The FIGS. 6 to 9 show the mechanical barrier structure 200 in a zoomed fashion allowing to provide reference signs for the ventilation path 240, and the boundary region 250 of the plate element 210. These features are also shown in FIGS. 1 to 5, however the reference signs of the ventilation path 240, and the boundary region 250 are not shown. A clearance 260 of the ventilation path 240 is set by a distance dz of the boundary region of the plate element 210 to the housing 110, in particular to the carrier 230 (see FIG. 2) attached to the housing 110 or to the substrate 160, and/or by the distance dz of the boundary region 250 of the plate element 210 to a blocking structure 270 which opposes the boundary region 250 of the plate element 210 (see FIG. 1, or FIGS. 3 to 5). The blocking structure 270 may be called a sealing wall. The distance dz extends along the z-direction. The clearance according to FIG. 2 extends along the y-axis, therefore the clearance 260 is dy. In FIG. 2 the clearance extends along the y-axis and optionally along the z-axis, therefore the clearance 260 is dy and optionally dz. As can be seen in FIG. 2, the blocking structure 270 can be attached to the substrate 160 being part of the housing 110. An additional blocking structure 270 attached to the carrier 230 is then optional (see FIG. 2, in FIG. 2 the blocking structure 270 is shown but may be omitted). Also, an additional blocking structure 270 attached to the housing 110, in particular to the substrate 160 is optional, if a blocking structure 270 is attached to the carrier. Stated differently, attaching one blocking structure 270 to the carrier 230 or to the housing 110, in particular the substrate 160, is sufficient to arrive at the improved characteristics. However, providing an additional second blocking structure 270 as just explained (see FIG. 2), may further improve the MEMS device 100. As shown in FIG. 2, the blocking structure 270 is attached to the carrier 230, and is attached to the substrate 160 being part of the housing 110. The ventilation path 240 extends in a direction parallel to (or in) the x-y-plane between the blocking structure 270 and the plate element 210. This means, the ventilation path 240 extends in a direction perpendicular to the x-y-plane, i.e. parallel to the z-direction.

The blocking structure 270, in particular in a form of a sealing wall, can be fixed to the carrier 230 (shown in the FIGS. 1, 3 to 9) or directly to another part of the housing 110 (shown in the FIG. 2), in particular the substrate 160. Moreover, the blocking structure 270 can be an integral part of the housing 110, in particular of the lid element 150 or the substrate 160. Further, the blocking structure 270 can be fixed to or can be an integral part of the MEMS chip. Further, the carrier 230 can be fixed to or can be an integral part of the lid 150 or to the substrate 160.

The term "fixed to" in this application is used in the sense of mounted to or attached to another component.

According to an embodiment as for example shown in FIGS. 1 to 5, the carrier 230 for the plate element 210 is an integral part of the housing 110 or is fixed to the housing 110. The term "is part of the housing" can be understood as "is integral with the housing" as opposed to being "fixed" or "attached" thereto. As can be seen in the FIGS. 1 to 9, the carrier 230 and the plate element are not directly attached to one another, but are attached to one another via, in particular at least one, elastic spacers 220. As shown in the side view of FIGS. 6a, 8a, and 9, each of the shown parts of the carrier 230 is provided with an elastic spacer 220 and, in particular at least, a blocking structure 270. In particular, as can be seen in FIGS. 6b and 8b showing top view of the mechanical barrier structure 200, the blocking structure 270 is provides by a single element or is provides by several element attached to one single element. As can be further seen in FIGS. 6b and 8b, the blocking structure 270 may surround the elastic spacers 220 (FIG. 6b) or may be surrounded by the elastic spacers 200 (FIG. 8b). As shown in 7a, one part of the carrier 230 is provided only with an elastic spacer 220, while another part of the carrier 230 is provided only with a blocking structure 270. Thus, according to the embodiment of FIG. 7a, the carrier 230 is provided with at least one elastic spacer 220 and/or at least one blocking structure 270. According to the top view of FIG. 7b showing a x-y plane, the blocking structure 270 comprises four elements and four elastic spacers 220 are provides. One blocking structure element is attach to one elastic spacer 220 forming a rectangle attached to the carrier 230. The carrier 230 can be one (single) element. However, it is possible that the carrier 230 comprises several elements that are attached to one another to form the carrier 230. It is also possible in some embodiments that the carrier 230 is not mandatory, if the carrier 230 for the plate element 210 is an integral part of the housing 110, for example. Then the at least one elastic spacer 220 and/or the at least one blocking structure 270 can be attached directly between the substrate 160 and the plate element 210 in a (so called) bottom port configuration. Alternatively, the at least one elastic spacer 220 and/or the at least one blocking structure 270 is attached directly between the lid element 150 and the plate element 210 in a (so called) top port configuration.

As can be seen from the FIGS. 1 to 9, along the z-direction a height $h_{220}$ of the elastic spacer 220 is greater than a height $h_{270}$ of the blocking structure 270. The difference of both heights result in a clearance 260 forming the ventilation path 240, i.e. height$_{220}$−height$_{270}$=clearance 260. Stated differently, the acoustical ventilation is defined by the height of the blocking structure 270 and the height of the clearance, in particular both along the z-direction.

Figure 9:
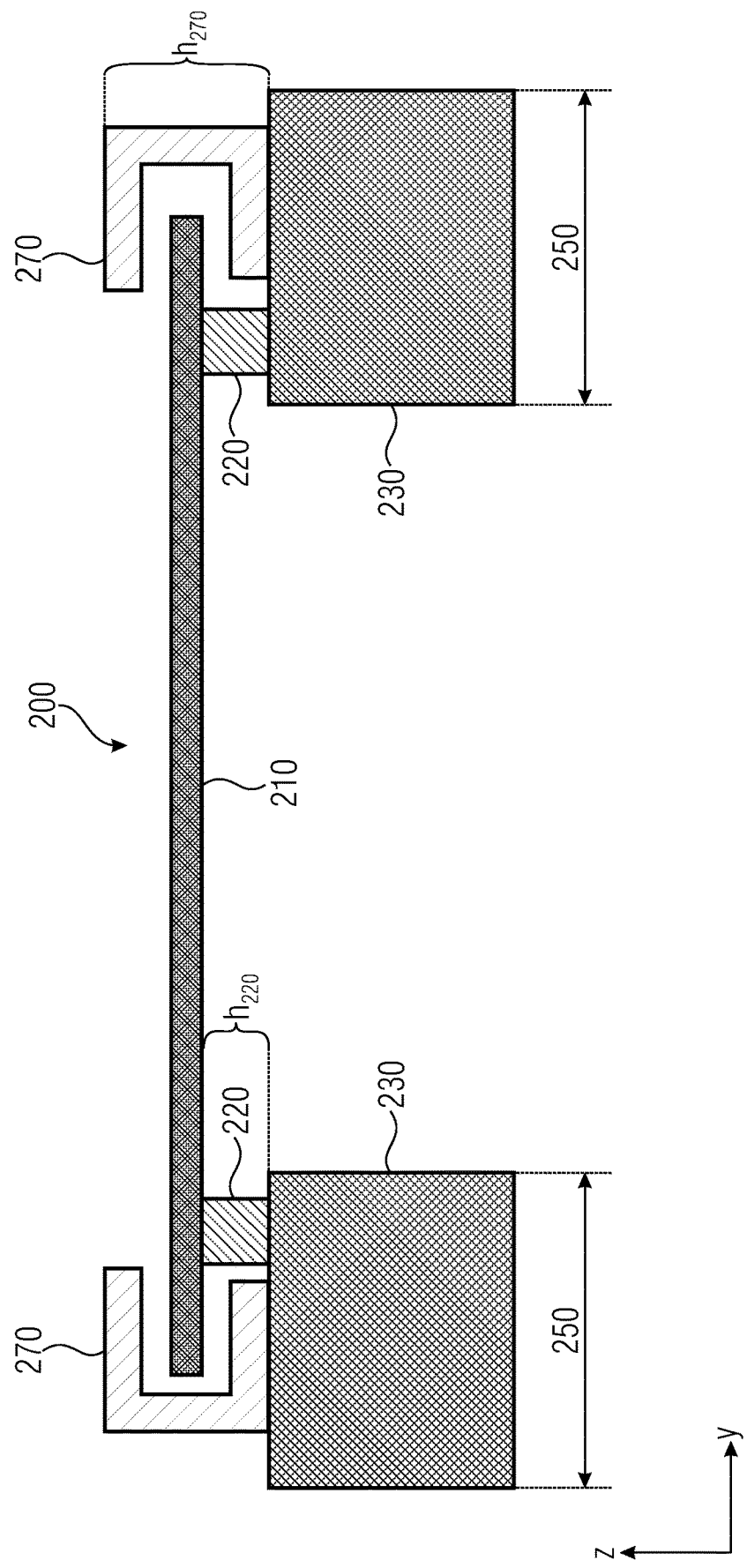
FIG. 9 shows a schematic cross sectional side view of a mechanical barrier structure of a MEMS device according to an embodiment.

The FIGS. 6a to 9 show different embodiments of the mechanical barrier structure 200. Comparing, for example, FIGS. 6a, 6b with FIGS. 8a, 8b, it can be seen that the blocking structure 270 and the spacer element 220, which are coupled between the plate element 210 and the carrier 230, may be arranged in different relative (lateral) positions with respect to each other, as shown in FIGS. 6 to 9. Stated differently, in embodiments, the blocking structure 270 is arranged inside the elastic spacer elements 220 or is arranged outside the elastic spacer elements 220. The blocking structure 270 may be rectangular (see FIG. 6b) or round shaped (see FIG. 8b). The blocking structure 270 can be a single element (FIGS. 6b and 8b), or several elements are attached to one another so that it forms a single element (FIG. 7b). The embodiments of FIG. 7b, for example, shows a blocking structure 270 comprising four elements, wherein each element of the blocking structure 270 is positioned next to an elastic spacer 220, so that the elastic spacers 220 together with the four elements of the blocking structure 270 form a rectangle in the x-y plane. Of course, more or less elastic spacers 220 and/or more or less elements of the blocking structure 270 may be provided. FIG. 7b shows symmetry lines A, B, along which the cross sectional side view of FIG. 7a is shown. Also, the resulting shape of such an attached assembly may be different, for example round shaped. The FIG. 7a shows a cross-sectional side view along the lines A, B shown in FIG. 7b. Point A' belongs to line A and point B' belongs to line B. At point B', an elastic element 220 is attached to the carrier 230. At point A', the blocking structure 270 is attached to the carrier 230. Line A is formed by connecting point A' with point M (center point), in that line A runs from point M through point A'. Line B is formed by connecting point A' with point M (see FIG. 7b), in that line B runs from point M through point B'. As shown in FIG. 9, for example, the blocking structure 270 has a C-shape in a y-z plane. Such a C-shape may be realized by silicon oxide etching or the like. Therewith, also the ventilation path 240 has a C-shape. It is possible, that the blocking structure 270 has another shape than the ones shown in the FIGS. 1 to 9.

An acoustical compliance $C_{plate}$ of the plate element 210 depends on the plate element area $A_{plate}$ and an area $A^{spacer}$ of the of the elastic spacer 220, in particular parallel to the plate element area $A_{plate}$, the height $\Delta z_{spacer}$(=height$_{220}$) of the elastic spacer 220, dz$_1$ the vertical deflection (or displacement) of the plate element 210 (due to the sound pressure), and the E-Modulus $E_{modulus}$ of the elastic spacer 220 (which is effective as a spring element), that is used.

The acoustical compliance $C_{plate}$ is given by:

$$C_{plate}=dz_1/p=dz_1*(A_{plate}/F) \quad (1).$$

Here, the (sound pressure dependent) deflection dz$_1$ of the plate element 210 is a variable and p=$A_{plate}$/F the sound pressure. The strain is given by:

$$\text{Strain}=F/A_{spacer}=E_{modulus}*(dz_1/\Delta z_{spacer}) \quad (2).$$

Converting equation (2) for the variable dz$_1$ and substituting the variable dz$_1$ into equation (1), results in the acoustical compliance $C_{plate}$:

$$C_{plate}=(A_{plate}/A_{spacer})*(\Delta z_{spacer}/E_{modulus}) \quad (3).$$

The equation (3) provides a simplified guide how to compute the acoustical compliance $C_{plate}$. For example, taking a square plate element 210 having a length of 2 mm, four elastic spacer 220, each elastic spacer 220 having a cube shape with a side length of 20 μm, and an $E_{modulus}$ of 1 MPa result in the acoustical compliance $C_{plate}$ of:

Area $A_{plate}$=(2 mm)$^2$;
Area $A_{spacer}$(of four spacers)=4*(20 μm)$^2$;
Height $\Delta z_{spacer}$=20 μm;

$E_{modulus}$=1 MPa;
$C_{plate}$=50 nm/Pa;
(=acoustical compliance of the plate element 210).

According to an embodiment, the carrier 230 may comprises at least one of a structured glass element, a structured silicon element, and a perforated metal plate. The term "structured carrier 230" is intended to illustrate that the carrier 230 can comprise a semi-conductive or insulating material or layer or layer stack (e.g., having a plurality of different layers), wherein the structure has a through-opening with a cross-sectional area which (approximately) corresponds to the cross-sectional area of the access port 130 of the housing 110.

According to an embodiment, the blocking structure 270 is a deposited and structured material on the carrier 230 and opposes the boundary region 250 of the plate element 210. The term "structured blocking structure 270" is intended to illustrate that the blocking structure 270 may be formed by structuring the surface region of the carrier 230 or by applying (and structuring) the material of the blocking structure 270 to the surface region of the carrier 230. For example, the deposited and structured material of the blocking structure 270 may be Imide or silicon oxide. Other materials, being elastic as or similar to these mentioned materials may also be used as elastic spacers 220. Another term for blocking structure 270 may be for example "sealing wall", because the blocking structure 270 inhibits particles from the environment to enter the MEMS device 100. In this sense the blocking structure 270 can be understood as a sealing wall sealing the MEMS device 100 from pollution from the outside. According to an embodiment, the blocking structure 270 comprises an imide material and/or a silicon-oxide material.

Presently the elastic spacer 220 can be understand as an elastic spacer element 230. The elastic spacer 230 may be given by a spring, which by definition of a spring is elastic. The term "spring" covers everything that is known to a person skilled in the art to be a spring and that is suitable to be placed as an elastic spacer 220 in the proposed MEMS device 100.

According to an embodiment, the elastic spacers 230 are fixed to areas of the boundary region 250 of the plate element 210. This can be seen in each of the FIGS. 1 to 9 enclosed with the present application. The boundary region 250 is for example defined as the part of the area of the plate element 201 overlapping the elastic spacers 230 and/or the blocking structure 270.

According to an embodiment, the material of the elastic spacers 230 has an E-modulus less than 1 MPa. According to an embodiment, the elastic spacers 230 comprise a silicone material and/or a glue material, in particular dots of a silicone material and/or of a glue material, for example, having an E-modulus less than 1 MPa. An E-modulus less than 1 MPa is considered a low E-modulus for the purpose of the technical teaching of the present application.

According to an embodiment, the plate element 210 comprises a stiff material with an E-modulus larger than 5 GPa. This means, the plate element 210 can be stiff, where in the contrary the elastic spacers are not stiff, but elastic. According to an embodiment, the plate element 210 comprises at least one of glass, silicon, and metal, which in particular have an E-modulus larger than 5 GPa.

According to an embodiment, the clearance 260 at the boundary region 250 of the plate element 210 is between 1 and 10 μm. The clearance 260 as such is positioned between the blocking element 270 and the plate element 210. The clearance 260 is in the range of 1 μm . . . 10 μm, wherein the clearance 260 can be realized by thermal shrinking of the blocking element 270, in particular after an application if the elastic space elements 220.

According to an embodiment, the housing 110 comprises a substrate 160 and a lid element 150, wherein the access port 130 is arranged in the substrate 130 (see FIGS. 1, 2 and 4, 5). According to the embodiments shown in FIGS. 1, 2 and 4, 5 the access port 130 corresponds to a bottom port configuration. The bottom port configuration with the mechanical barrier structure 200 is attached to or integrated in the substrate 160.

Figure 3:
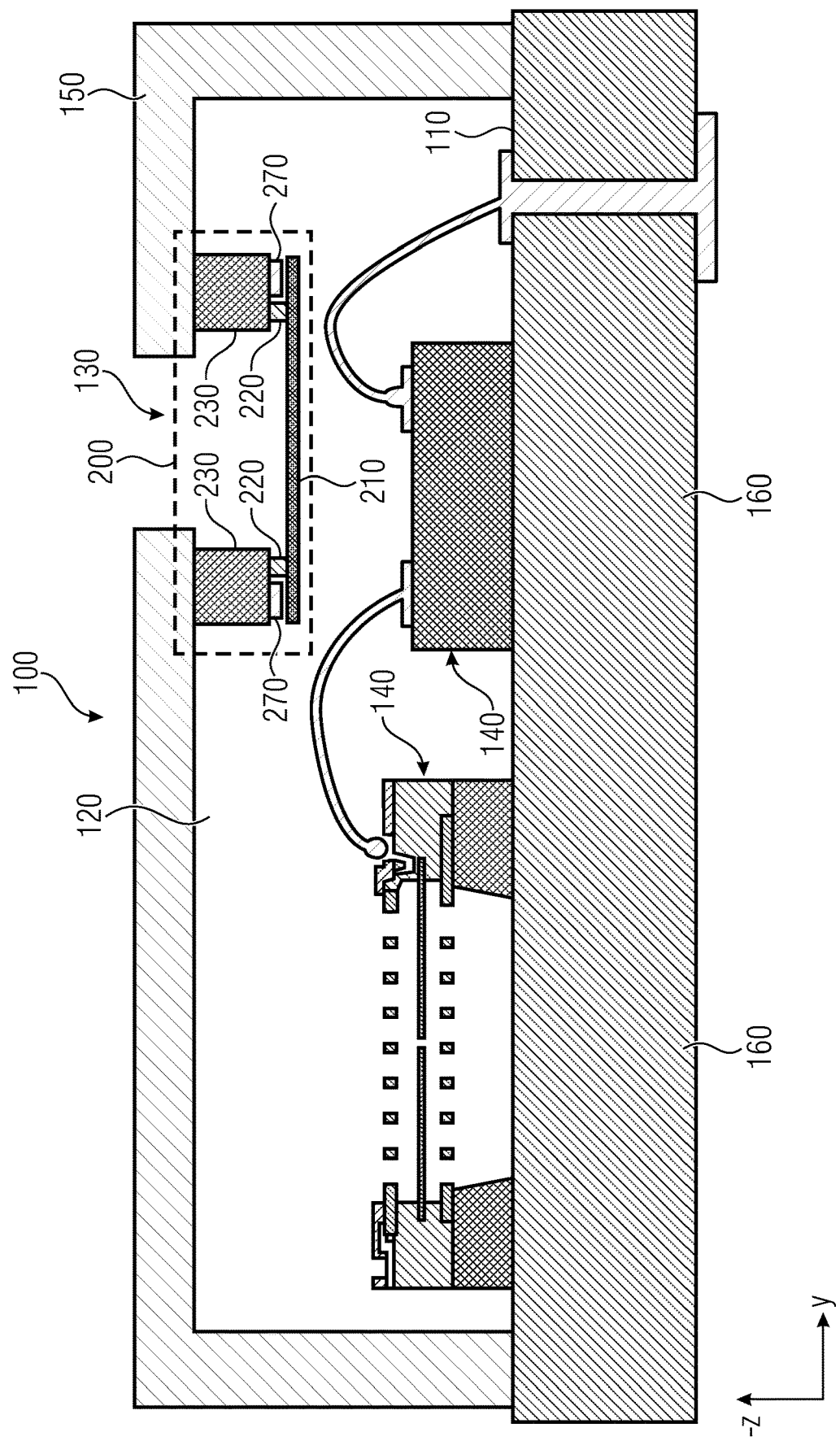
FIG. 3 shows a schematic cross sectional side view of a MEMS device having a mechanical barrier structure according to an embodiment.
Figure 4:
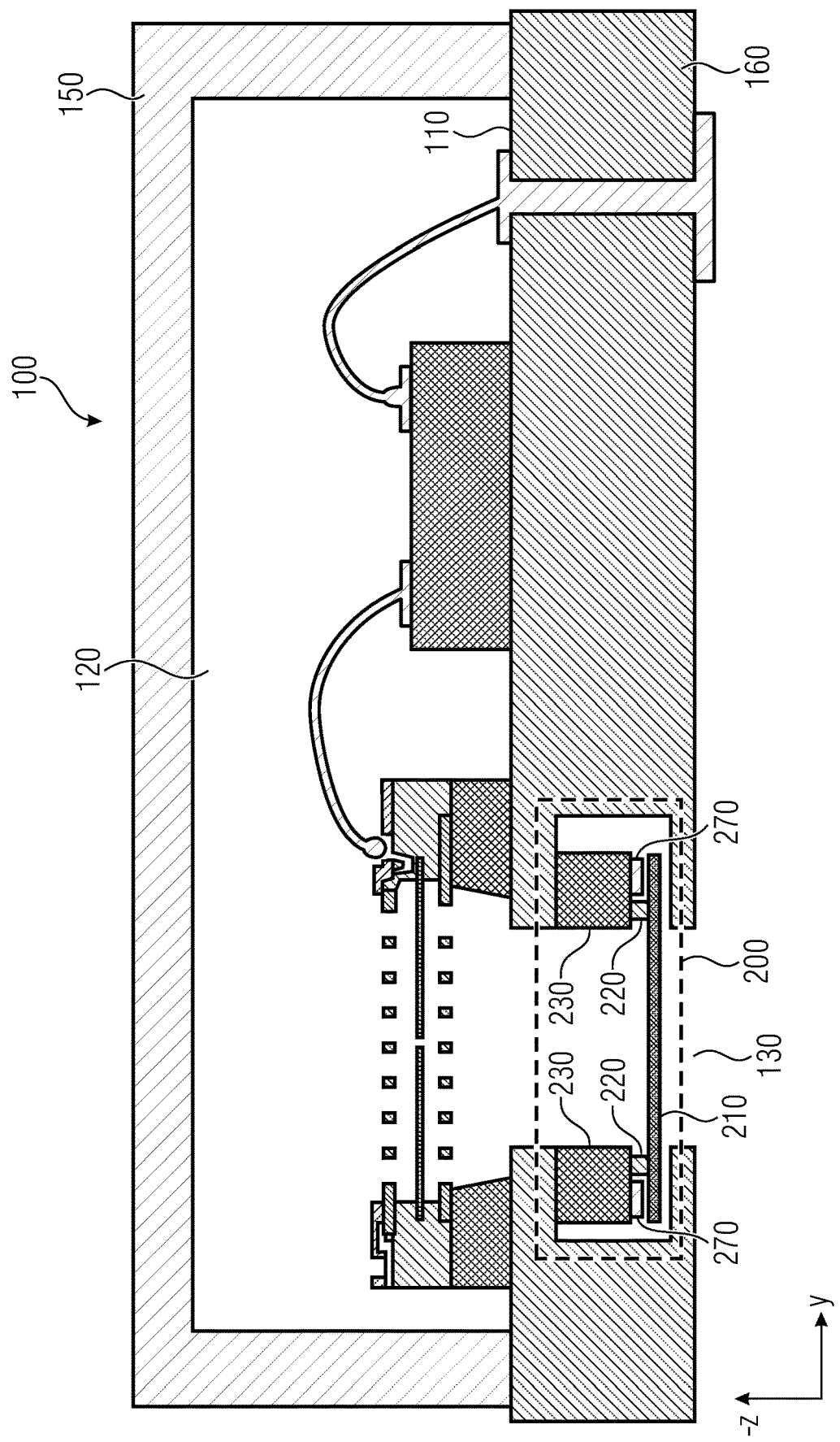
FIG. 4 shows a schematic cross sectional side view of a MEMS device having a mechanical barrier structure according to an embodiment.
Figure 5:
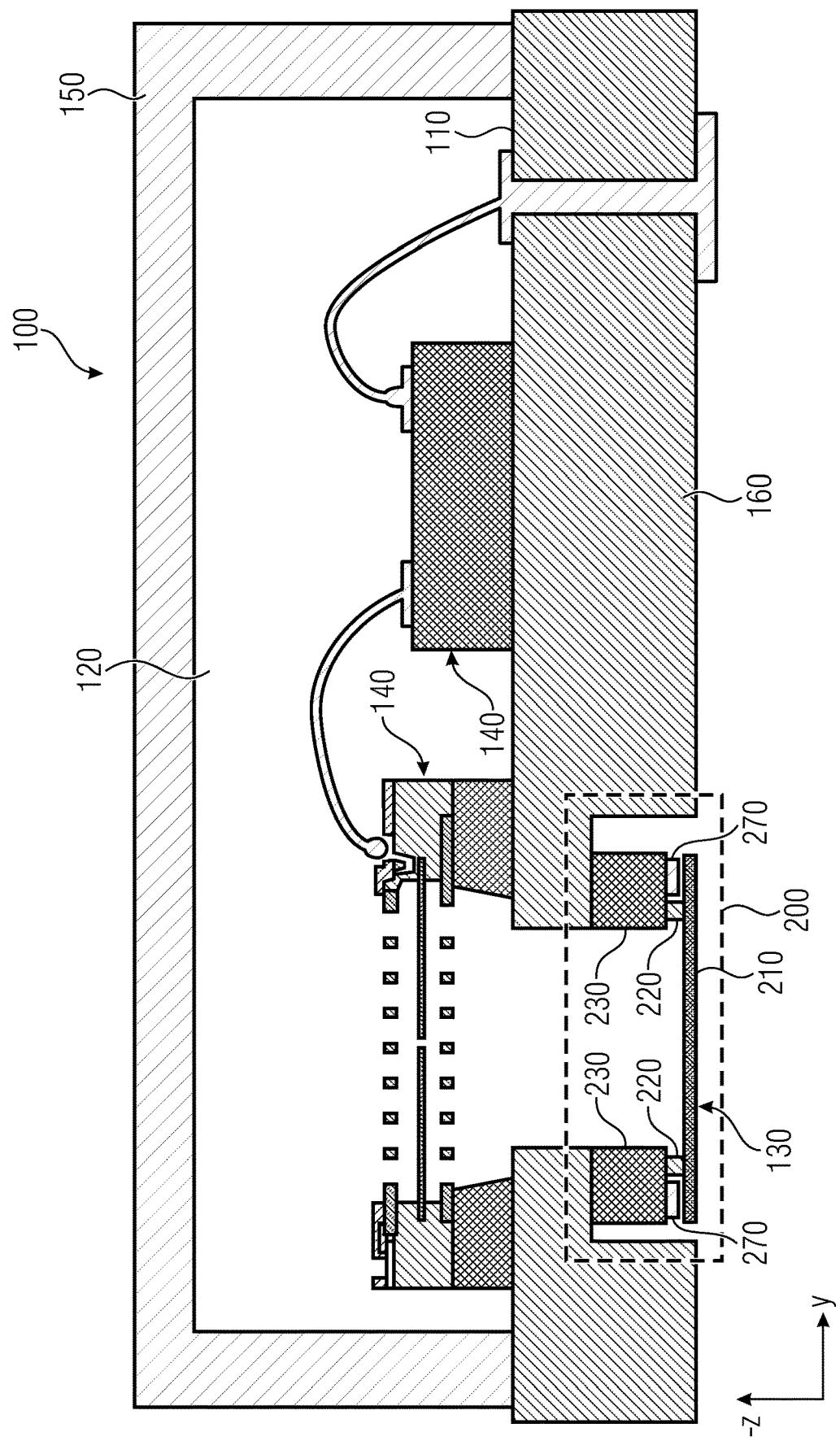
FIG. 5 shows a schematic cross sectional side view of a MEMS device having a mechanical barrier structure according to an embodiment.

According to an embodiment, the housing 110 comprises a substrate 160 and a lid element 150, wherein the access port is arranged in the lid element 150, and wherein the carrier 230 with the plate element 210 is fixed to the lid, as can be seen in FIG. 3. According to the embodiment shown in FIG. 3 the access port 130 corresponds to a top port configuration. The top port configuration with the mechanical barrier structure 200 is attached to or integrated in the lid element 150.

According to an embodiment, a sidewall region of the access port 130 in the substrate 160 opposes the boundary region 250 of the plate element 210, as can be seen in FIGS. 1, 2, 4, and 5. The access port 130 corresponds to a hole in the substrate 160 or in the lid element 150. In said hole the mechanical barrier structure 200 is positioned. The access port 130 is a port to the interior volume 120 of the MEMS device 100. As shown in FIGS. 1, 2, 4, and 5, the sidewall region of the access port 130 oppose a side wall of the boundary region 250 of the plate element 210. In FIGS. 1, 2, 4 and 5, the side wall region of the access port 130 corresponds to a side wall of the substrate 160 or to a blocking structure 270 attached to the substrate 160. As shown in FIG. 3, the sidewall region of the access port 130 oppose a side wall of the lid element 150. The access port 130 is provided by the mechanical barrier structure 200.

An improved MEMS device 100 is proposed herein, wherein the MEMS device 100 is provides with a mechanical barrier structure 200.

An environmental mechanical barrier structure 200 may have below features:
 a closed membrane/plate element 210 to stop fluids and particles in the μm scale from entering the MEMS device 100;
 low ventilation to minimize acoustical impacts and to minimize ingress of particles and fluids;
 high compliance, typically higher than the sensor meaning>10 nm/Pa; and
 high robustness against pressure and shocks.

Thus, the above embodiments provide possible implementation options for realizing the plate element 210 of the mechanical barrier structure 200 so that the plate material is (1) robust but not too stiff, and (2) on the other hand sensitive enough, and (3) is inexpensively to integrate into the sensor without impacting the sensor performance.

Embodiments describe a construction of an inexpensive (low cost) environmental barrier featuring a high acoustical compliance and low bypass ventilation. High compliance can be realized by elastic spacers, for example by low E-modulus spring elements. A low bypass ventilation is realized for example by a closed plate element and a blocking structure, which may also be called a sealing wall.

The embodiments described herein are provided with these features. The present disclosure discloses a simplified system design of a MEMS device 100 providing improved end user audio experience.

Additional embodiments and aspects are described which may be used alone or in combination with the features and functionalities described herein.

According to an embodiment, MEMS device comprises a housing with an interior volume, wherein the housing comprises an access port to the interior volume; a MEMS sound transducer in the housing, and a mechanical barrier structure having a plate element which is fixed by means of elastic spacers to a carrier and overlaps the access port, and providing a ventilation path passing a boundary region of the plate element, wherein a clearance of the ventilation path is set by the distance of the boundary region of the plate element to the housing, in particular to the carrier attached to the housing or to the substrate, or by the distance of the boundary region of the plate element to a blocking structure which opposes the boundary region of the plate element.

According to an embodiment, the carrier for the plate element is an integral part of the housing or is fixed to the housing.

According to an embodiment, the carrier comprises at least one of a structured glass element, a structured silicon element, and a perforated metal plate.

According to an embodiment, the blocking structure is a deposited and structured material on the carrier and opposes the boundary region of the plate element.

According to an embodiment, the blocking structure comprises an imide material and/or a silicon-oxide material.

According to an embodiment, the elastic spacers are fixed to areas of the boundary region of the plate element.

According to an embodiment, the material of the elastic spacers has an E-modulus less than 1 MPa.

According to an embodiment, the elastic spacers comprise a silicone material and/or a glue material, in particular dots of a silicone material and/or of a glue material.

According to an embodiment, the plate element comprises a stiff material with an E-modulus larger than 5 GPa.

According to an embodiment, the plate element comprises at least one of glass, silicon, and metal.

According to an embodiment, the clearance at the boundary region of the plate element is between 1 and 10 µm.

According to an embodiment, the housing comprises a substrate and a lid element, wherein the access port is arranged in the substrate.

According to an embodiment, the housing comprises a substrate and a lid element, wherein the access port is arranged in the lid, and wherein the carrier with the plate element is fixed to the lid.

According to an embodiment, a sidewall region of the access port in the substrate opposes the boundary region of the plate element.

Additional embodiments and aspects are described which may be used alone or in combination with the features and functionalities described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A MEMS device comprising:
   a housing with an interior volume, wherein the housing comprises an access port to the interior volume;
   a MEMS sound transducer in the housing;
   a mechanical barrier structure having a plate element, which is fixed by elastic spacers to a carrier and overlaps the access port; and
   a ventilation path passing a boundary region of the plate element, wherein the boundary region is defined as a peripheral area of the plate element overlapping the elastic spacers and/or a blocking structure, wherein the blocking structure is located on the carrier, wherein the blocking structure is configured to inhibit particles from an environment to enter the housing of the MEMS device, and
   wherein a clearance of the ventilation path is defined as a distance between the blocking structure and the plate element.

2. The MEMS device of claim 1, wherein the carrier for the plate element is an integral part of the housing.

3. The MEMS device of claim 1, wherein the carrier comprises at least one of a structured glass element, a structured silicon element, or a perforated metal plate.

4. The MEMS device of claim 1, wherein the blocking structure is a deposited and structured material on the carrier and opposes the boundary region of the plate element.

5. The MEMS device of claim 1, wherein the blocking structure comprises an imide material.

6. The MEMS device of claim 1, wherein the elastic spacers are fixed to areas of the boundary region of the plate element.

7. The MEMS device of claim 1, wherein a material of the elastic spacers has an E-modulus less than 1 MPa.

8. The MEMS device of claim 1, wherein the elastic spacers comprise a silicone material and/or a glue material.

9. The MEMS device of claim 1, wherein the plate element comprises a stiff material with an E-modulus larger than 5 GPa.

10. The MEMS device of claim 1, wherein the plate element comprises at least one of glass, silicon, or metal.

11. The MEMS device of claim 1, wherein the clearance at the boundary region of the plate element is between 1 µm and 10 µm.

12. The MEMS device of claim 1, wherein the housing comprises a substrate and a lid element, wherein the access port is arranged in the substrate.

13. The MEMS device of claim 1, wherein the housing comprises a substrate and a lid element, wherein the access port is arranged in the lid element, and wherein the carrier with the plate element is fixed to the lid element.

14. The MEMS device of claim 12, wherein a sidewall region of the access port in the substrate opposes the boundary region of the plate element.

15. The MEMS device of claim 1, wherein the carrier for the plate element is fixed to the housing.

16. The MEMS device of claim 1, wherein the blocking structure comprises a silicon-oxide material.

17. The MEMS device of claim 1, wherein the elastic spacers comprise dots of a silicone material and/or dots of a glue material.

18. The MEMS device of claim 1, wherein the mechanical barrier structure is located in a substrate of the housing so that the plate element is located at an outside of the substrate.

* * * * *